US010348171B2

(12) United States Patent
Parati

(10) Patent No.: US 10,348,171 B2
(45) Date of Patent: Jul. 9, 2019

(54) NEEDLE WINDING MACHINE, PARTICULARLY FOR WINDING POLES ARRANGED INSIDE A CYLINDRICAL SURFACE

(71) Applicant: MARSILLI S.P.A., Castelleone (IT)

(72) Inventor: Gian Battista Parati, Castelleone (IT)

(73) Assignee: MARSILLI S.P.A., Castelleone (IT)

( * ) Notice: Subject to any disclaimer, the term of this patent is extended or adjusted under 35 U.S.C. 154(b) by 0 days.

(21) Appl. No.: 15/518,643

(22) PCT Filed: Oct. 9, 2015

(86) PCT No.: PCT/EP2015/073433
§ 371 (c)(1),
(2) Date: Apr. 12, 2017

(87) PCT Pub. No.: WO2016/058947
PCT Pub. Date: Apr. 21, 2016

(65) Prior Publication Data
US 2017/0229947 A1    Aug. 10, 2017

(30) Foreign Application Priority Data

Oct. 14, 2014   (IT) .............................. MI2014A1787

(51) Int. Cl.
*H02K 15/095*   (2006.01)
*H02K 15/085*   (2006.01)
*H01F 41/088*   (2016.01)

(52) U.S. Cl.
CPC ......... *H02K 15/095* (2013.01); *H02K 15/085* (2013.01); *H01F 41/088* (2016.01)

(58) Field of Classification Search
CPC ........................... H01F 41/088; H02K 15/085
See application file for complete search history.

(56) References Cited

U.S. PATENT DOCUMENTS 3,974,664 A * 8/1976 Erb ..................... D04B 15/78
                                                 66/218
6,003,805 A    12/1999 Newman
(Continued)

FOREIGN PATENT DOCUMENTS

CN     203827133 U    9/2014
CN     104079125 A    10/2014
(Continued)

OTHER PUBLICATIONS

International Search Report and Written Opinion dated Dec. 23, 2015 issued in PCT/EP2015/073433.
(Continued)

*Primary Examiner* — Emmanuel M Marcelo
(74) *Attorney, Agent, or Firm* — Scully, Scott, Murphy & Presser, P.C.

(57) ABSTRACT

A needle winding machine, particularly for winding poles arranged inside a cylindrical surface, the machine comprising a main supporting structure that supports at least one spindle that is extended around an axis and is provided, at an axial end thereof, with a head that supports a wire guiding tube; the spindle can move on command parallel to its own axis and can rotate on command about its own axis with respect to the main supporting structure; the wire guiding tube can rotate on command, with respect to the remaining part of the spindle, about a rotation axis that is substantially perpendicular to the axis of the wire guiding tube and can move on command, with respect to the remaining part of the spindle, along a direction that is oriented radially with respect to the axis of the spindle.

10 Claims, 19 Drawing Sheets

(56) References Cited

U.S. PATENT DOCUMENTS

| | | | | |
|---|---|---|---|---|
| 7,097,128 B2* | 8/2006 | Stratico | ................ | H02K 15/095 242/432.2 |
| 2004/0035974 A1* | 2/2004 | Stratico | ................ | H02K 15/095 242/432.4 |

FOREIGN PATENT DOCUMENTS

| | | |
|---|---|---|
| CN | 203859649 U | 10/2014 |
| DE | 3516763 A1 | 11/1985 |
| EP | 1759446 A1 | 3/2007 |
| EP | 1936784 A1 | 6/2008 |
| EP | 2378647 A1 | 10/2011 |
| JP | 2003-169455 A | 6/2003 |
| WO | WO 2005/124974 A1 | 12/2005 |

OTHER PUBLICATIONS

Italian Search Report dated Jun. 16, 2015 issued in IT MI20141787, with partial translation.
Chinese Office Action dated Sep. 4, 2018 received in Chinese Patent Application No. 201580055661.7.

* cited by examiner

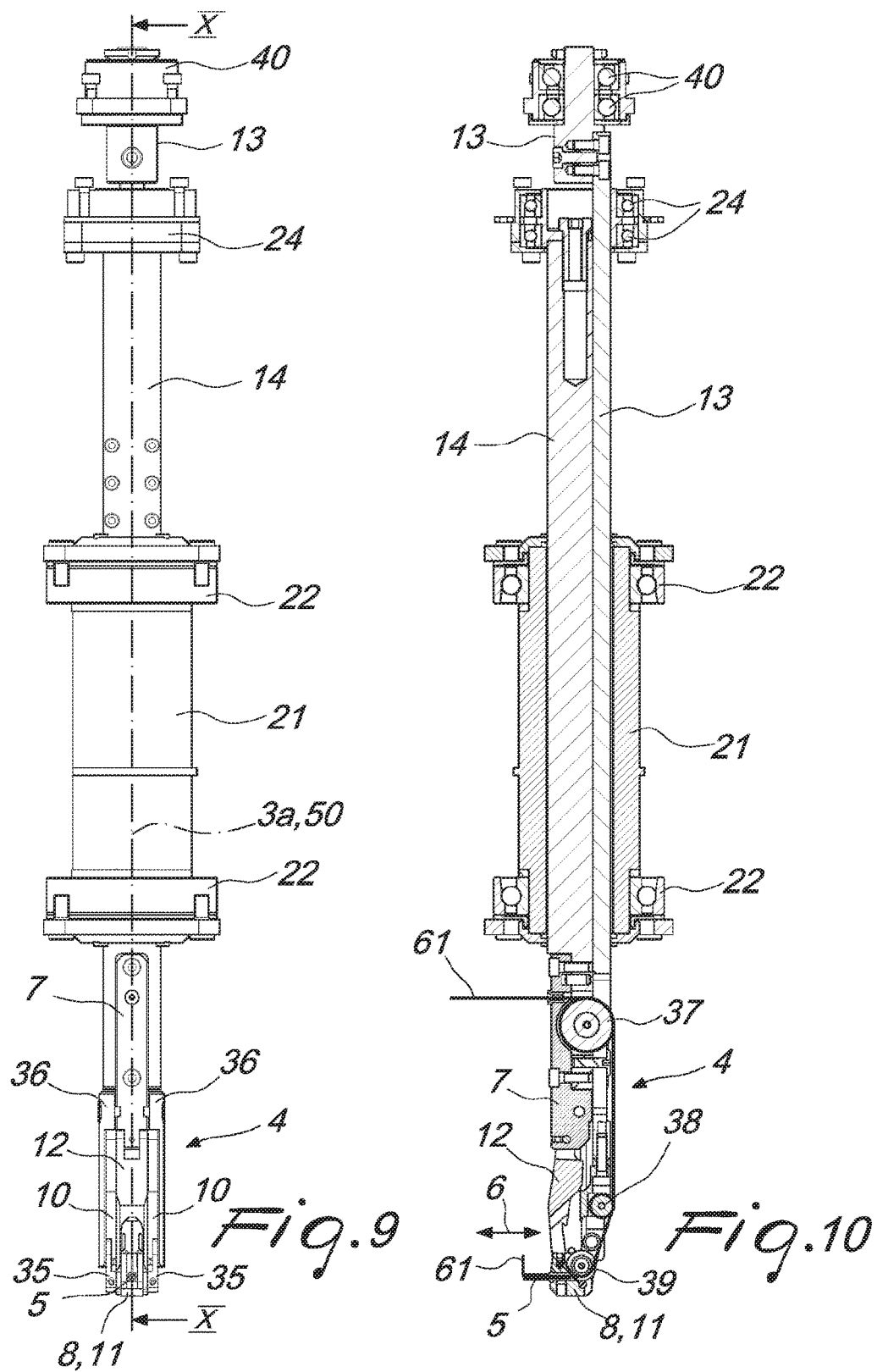

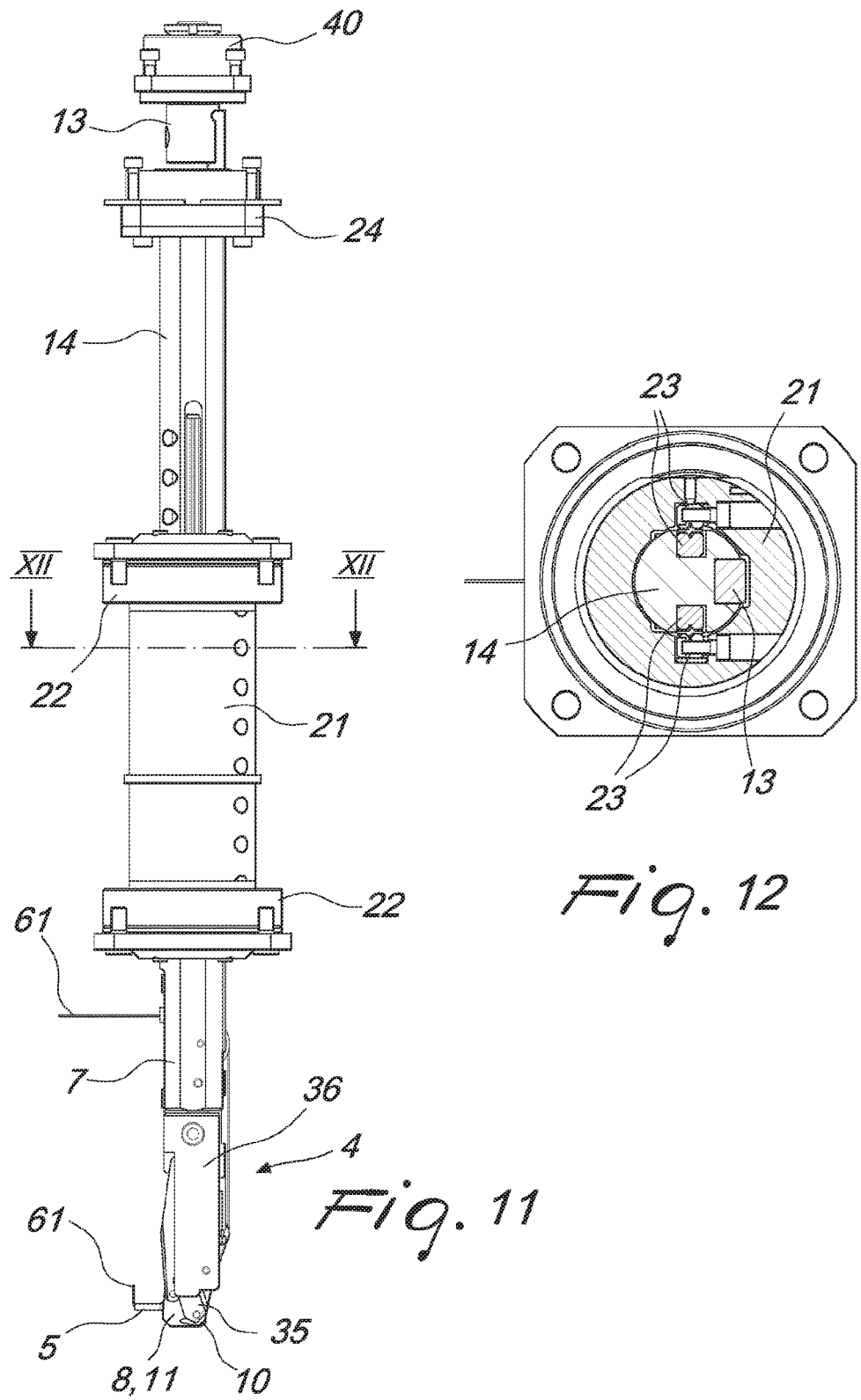

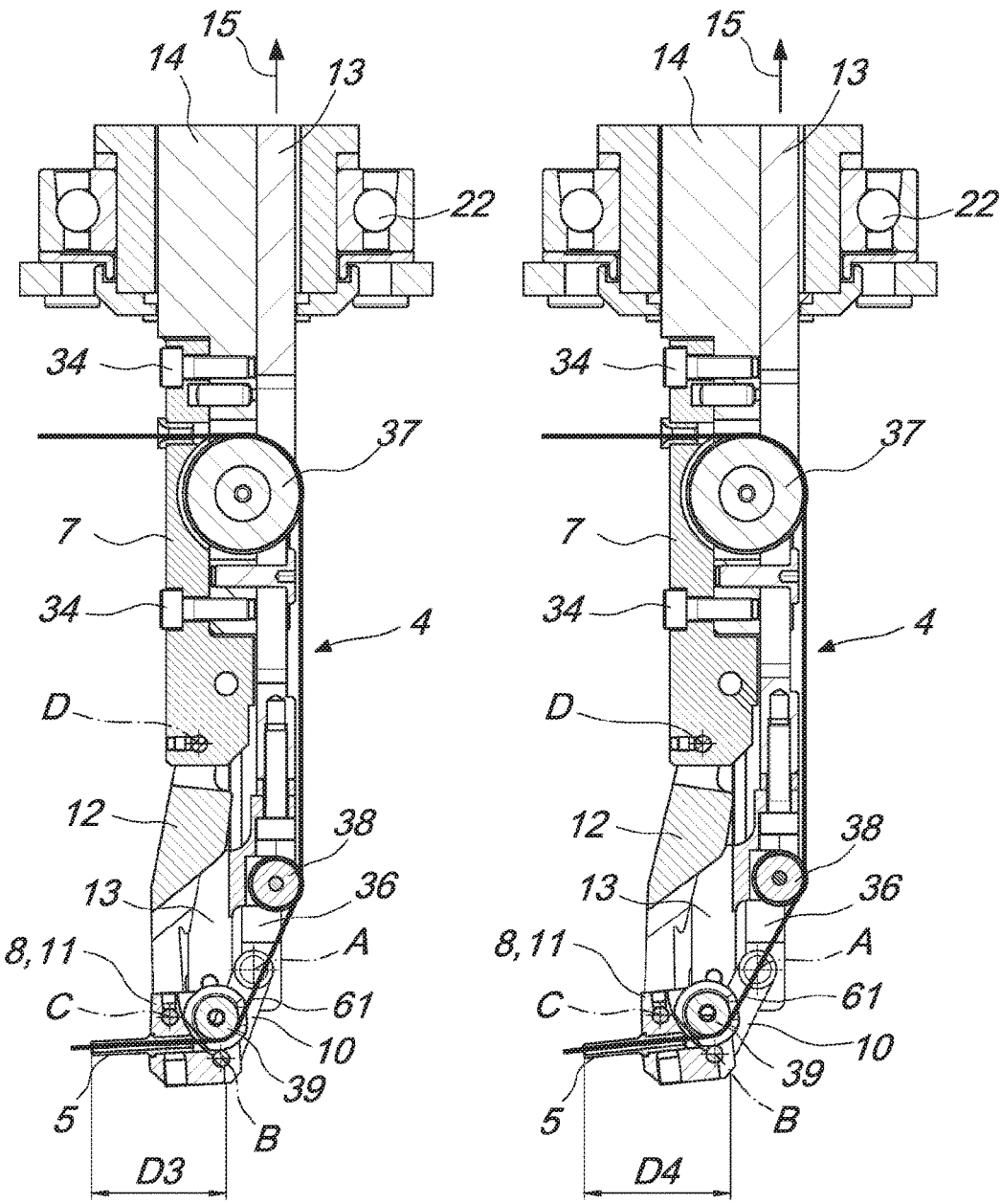

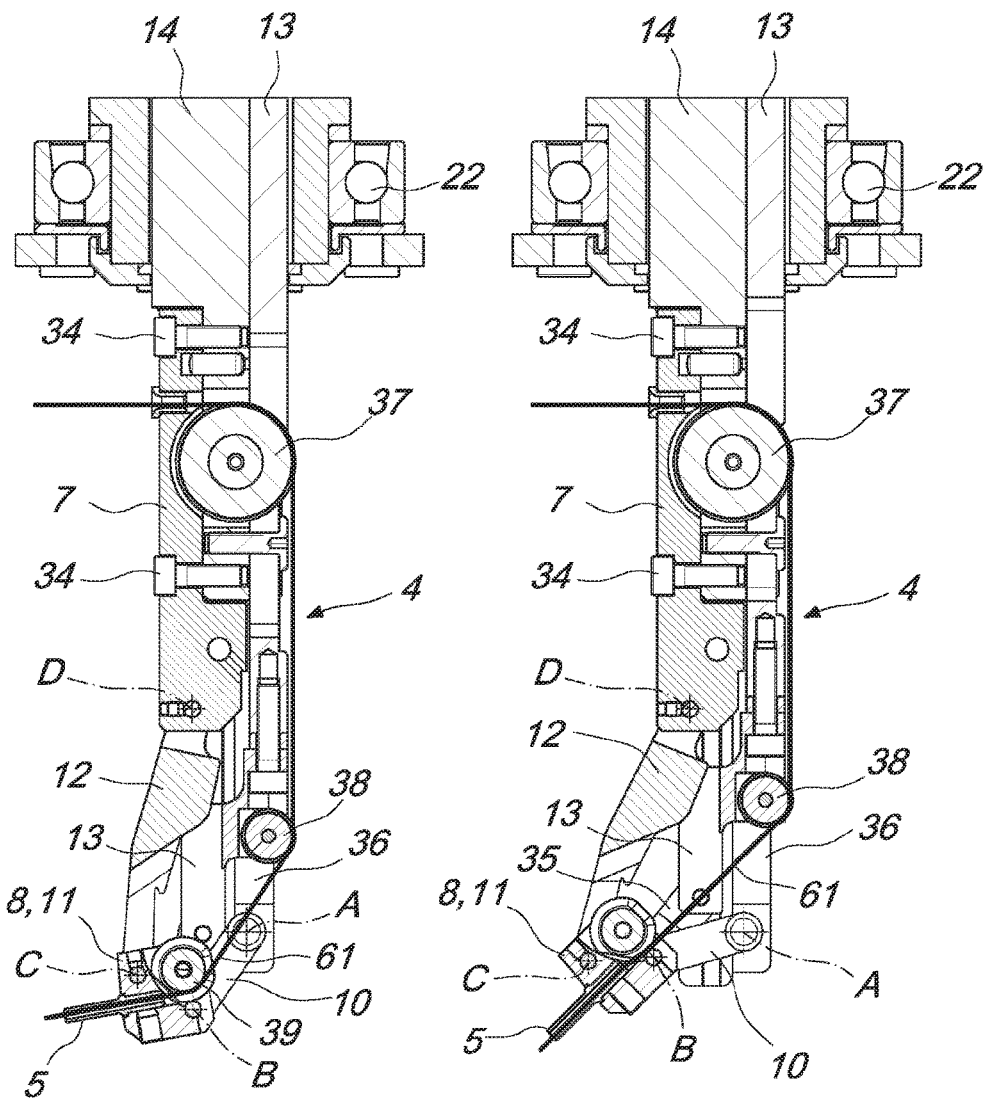

NEEDLE WINDING MACHINE, PARTICULARLY FOR WINDING POLES ARRANGED INSIDE A CYLINDRICAL SURFACE

The present invention relates to a needle winding machine, particularly for winding poles arranged inside a cylindrical surface, as in the case of stators of electric motors.

Winding machines are known which are provided with a needle-like wire guiding tube that can be inserted between the poles that protrude from the inner side of a cylindrical surface in order to perform the winding, with a copper wire, of poles of stators of electric motors.

Usually, these machines, such as for example the machine disclosed in EP 1759446 B1, use a single wire guiding tube and the winding and layering of the wire around the pole is achieved by moving the support on which the stator is placed, while the wire guiding tube remains stationary.

These machines suffer the problem of having long winding times and low productivity. This problem arises mainly from the fact that due to the masses of the bodies to be moved and to their inertia, it becomes necessary to use motors with a high torque and power, to the detriment of the speed of execution of the windings.

The aim of the present invention is to solve the problem described above, by providing a needle winding machine, particularly for winding poles arranged inside a cylindrical surface, that can reach higher winding speeds than obtainable with needle winding machines of the known type.

Within this aim, an object of the invention is to provide a needle winding machine that can achieve higher productivities than those obtainable with winding machines of the known type.

Another object of the invention is to provide a needle winding machine that ensures high precision in the execution of the windings.

Another object of the invention is to provide a needle winding machine that offers the greatest assurances of safety and reliability in use.

This aim, as well as these and other objects that will become better apparent hereinafter, are achieved by a needle winding machine, particularly for winding poles arranged inside a cylindrical surface, comprising a main supporting structure that supports at least one spindle that is extended around an axis and is provided, at an axial end thereof, with a head that supports a wire guiding tube, characterized in that said spindle can move on command parallel to its own axis and can rotate on command about its own axis with respect to the main supporting structure, and in that said wire guiding tube can rotate on command, with respect to the remaining part of the spindle, about a rotation axis that is substantially perpendicular to the axis of the wire guiding tube and can move on command, with respect to the remaining part of the spindle, along a direction that is oriented radially with respect to the axis of the spindle.

Further characteristics and advantages of the invention will become better apparent from the description of a preferred but not exclusive embodiment of the machine according to the invention, illustrated by way of nonlimiting example in the accompanying drawings, wherein:

FIG. 9 is a front elevation view of a spindle of the machine according to the invention;

FIG. 10 is a sectional view of FIG. 9, taken along the line X-X;

FIG. 11 is a side elevation view of a spindle of the machine according to the invention;

FIG. 12 is an enlarged-scale sectional view of FIG. 1, taken along the line XII-XII;

FIGS. 22 to 28 are sectional views, taken similarly to FIG. 14, of some of the possible positions of the wire guiding tube of a spindle of the machine according to the invention;

Figure 1:
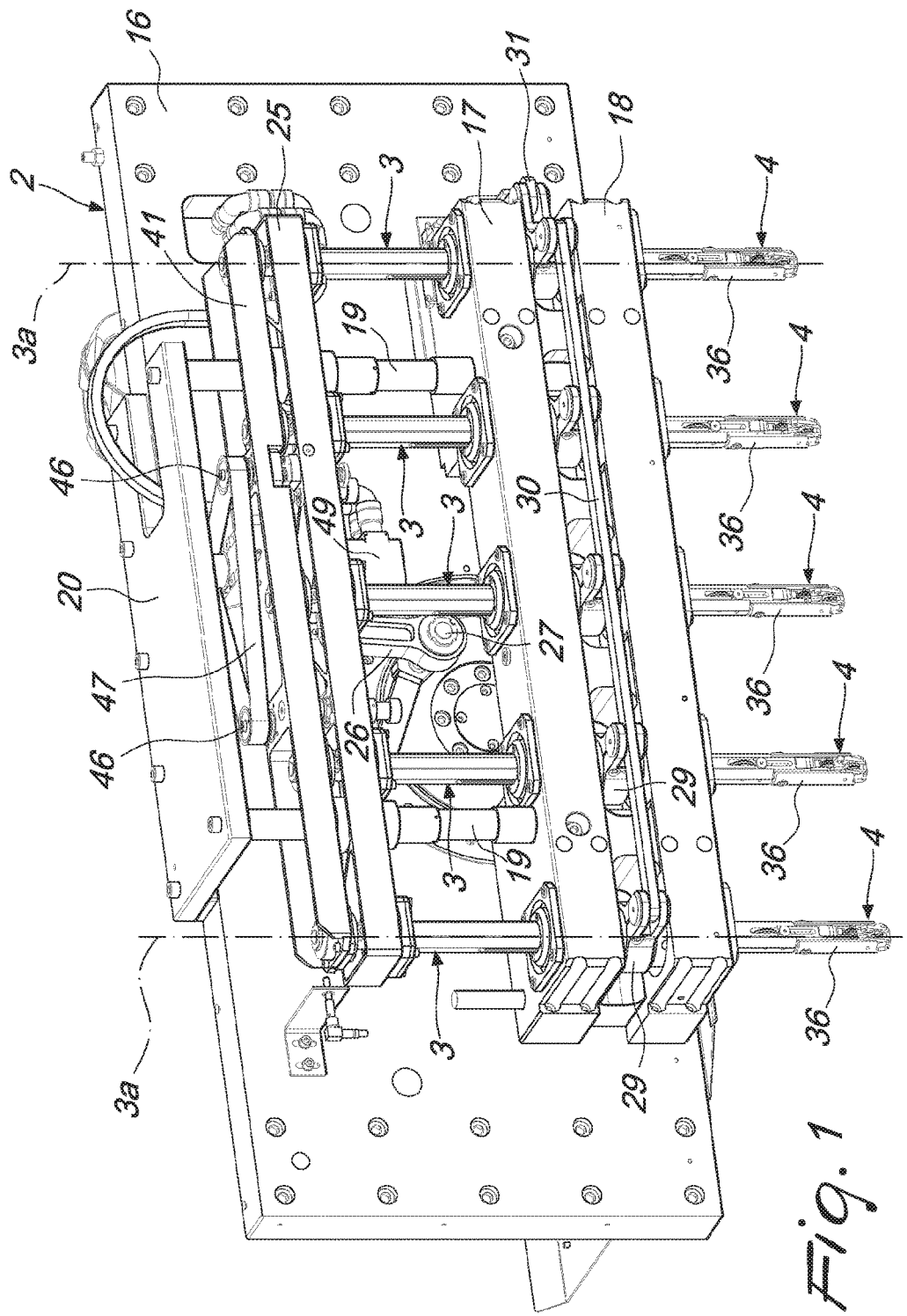
FIG. 1 is a perspective view of a part of a machine according to the invention.
Figure 2:
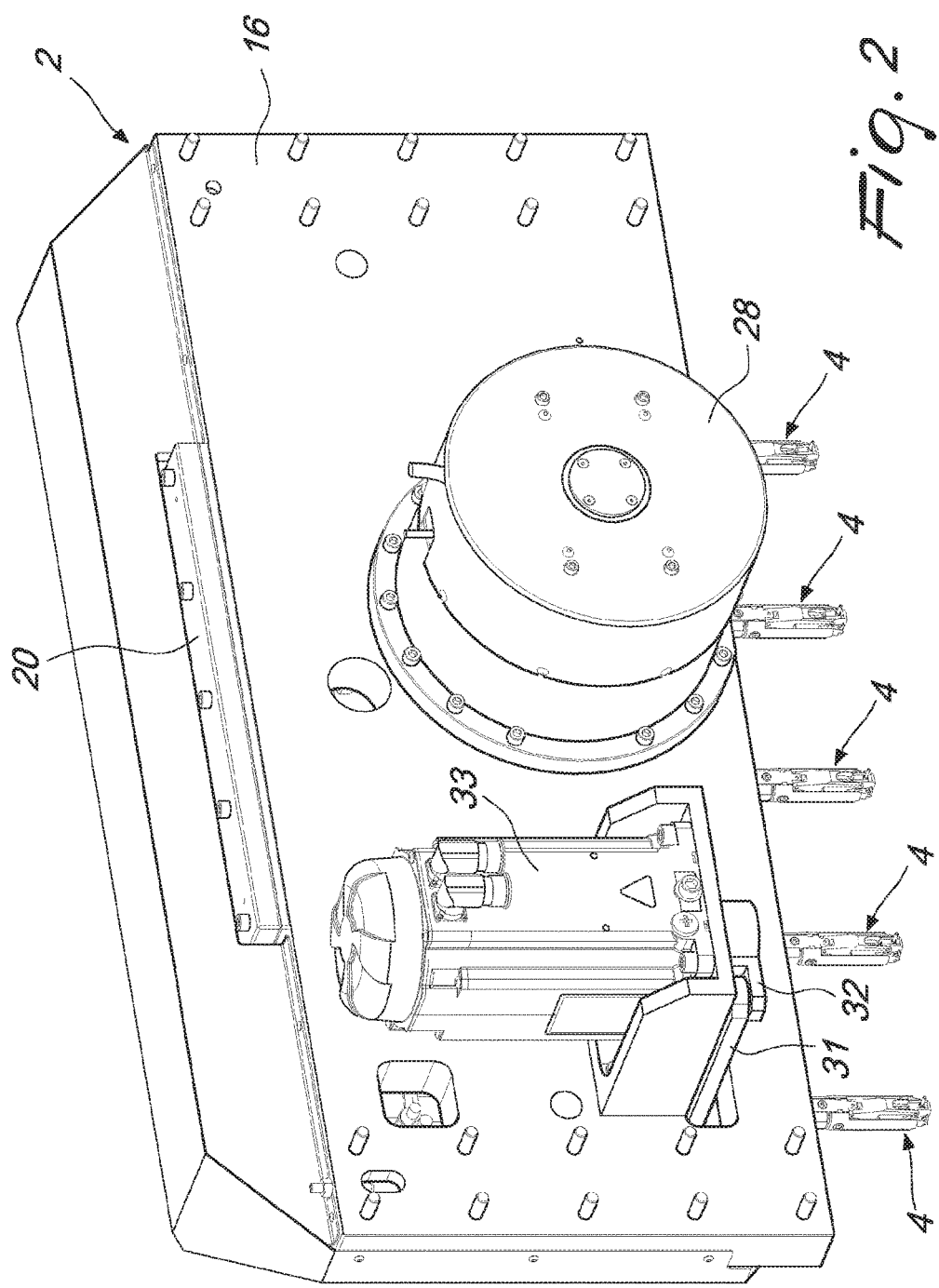
FIG. 2 is a view of the same part of the machine shown in FIG. 1, taken from a different angle.
Figure 3:
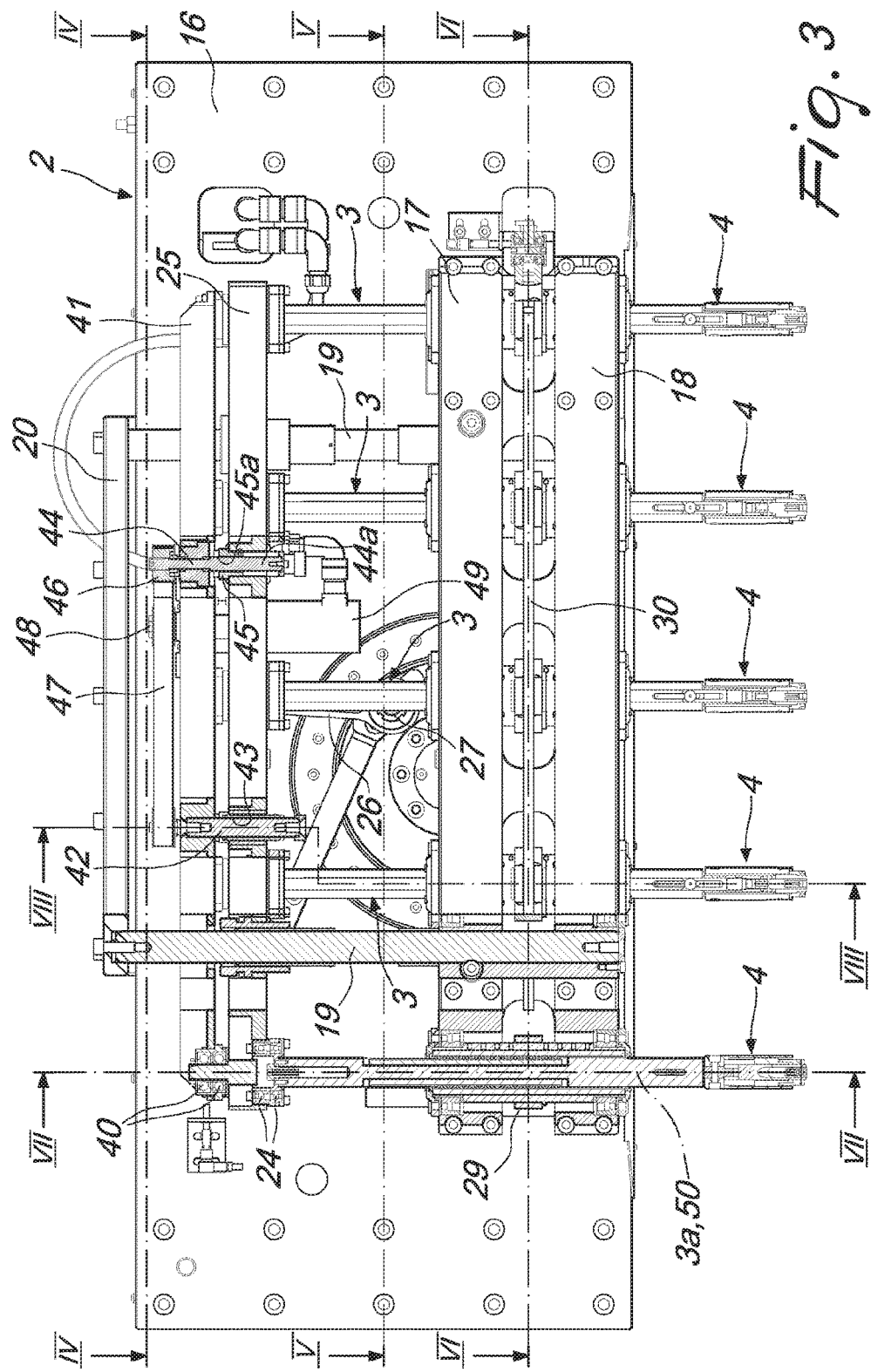
FIG. 3 is a partially sectional front elevation view of the same part of the machine shown in FIGS. 1 and 2.
Figure 4:
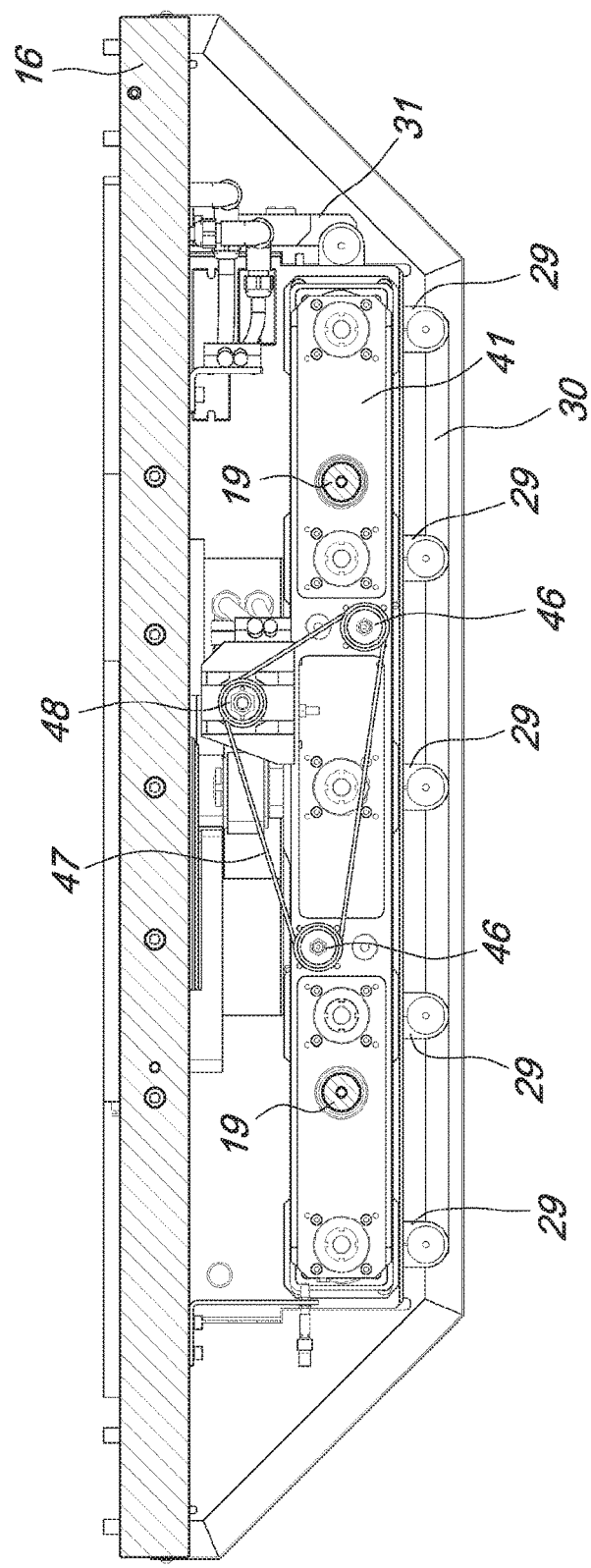
FIG. 4 is a sectional view of FIG. 3, taken along the line IV-IV with some components omitted for the sake of simplicity.
Figure 5:
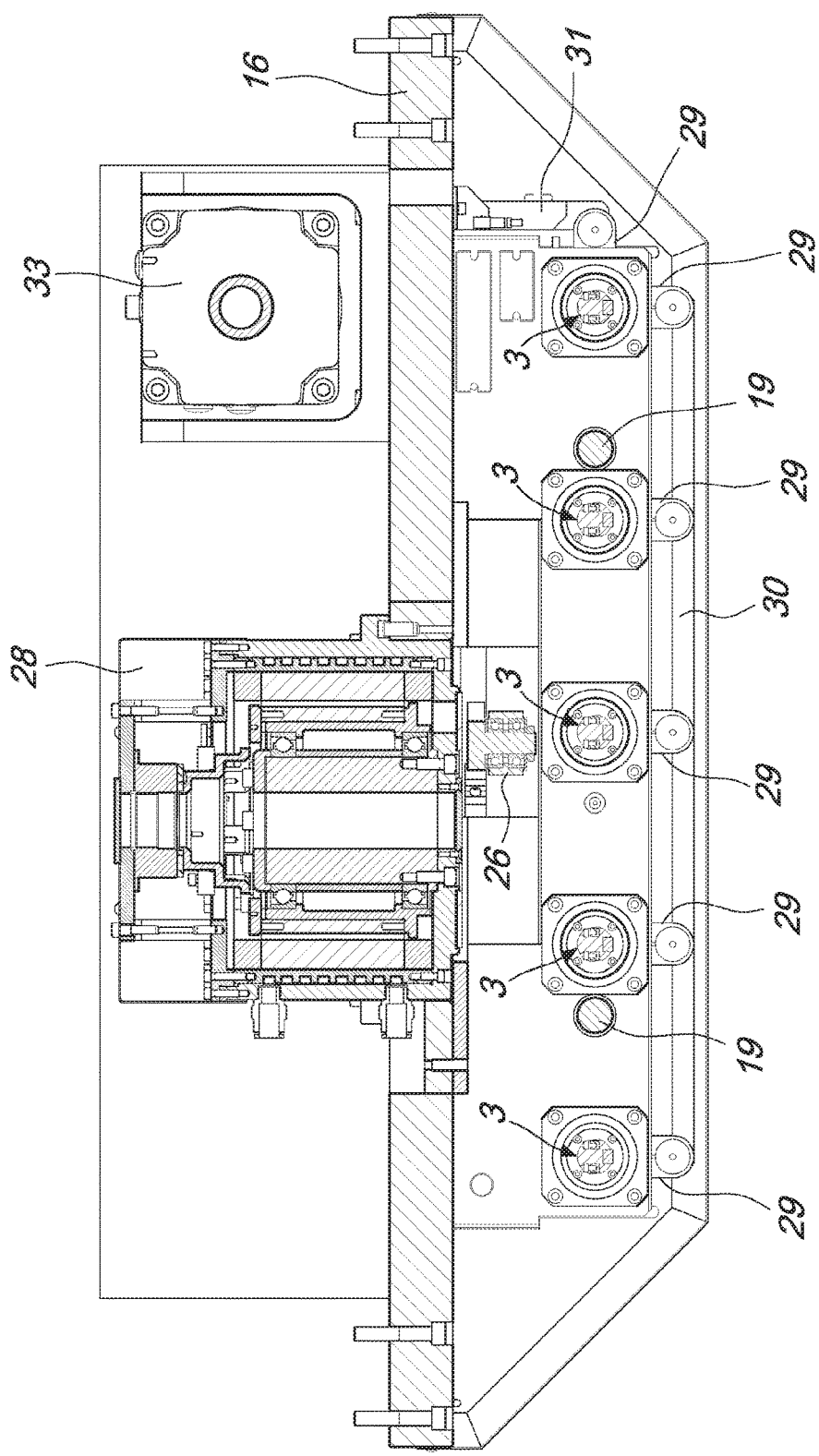
FIG. 5 is a sectional view of FIG. 3, taken along the line V-V.
Figure 6:
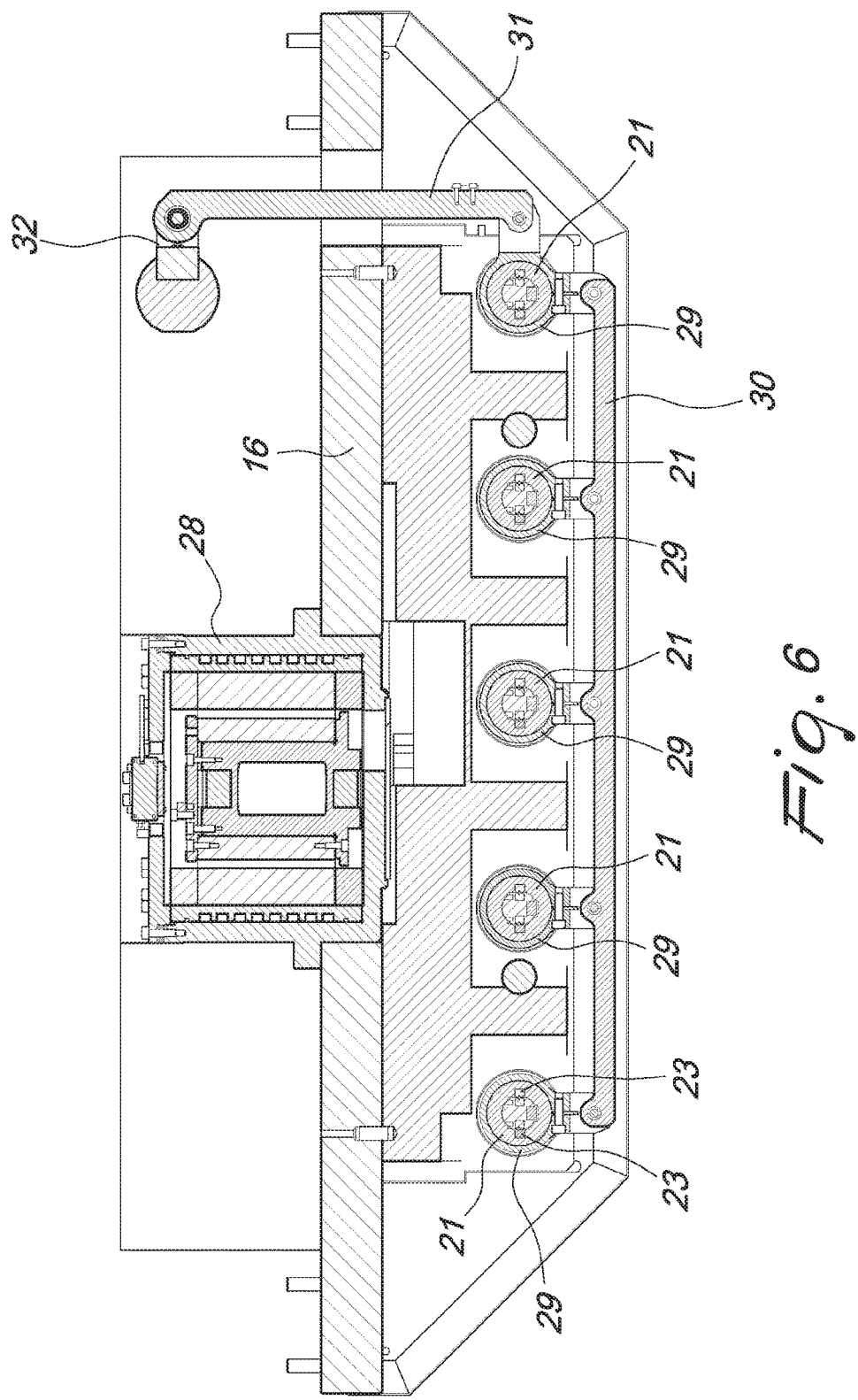
FIG. 6 is a sectional view of FIG. 3, taken along the line VI-VI.
Figure 7:
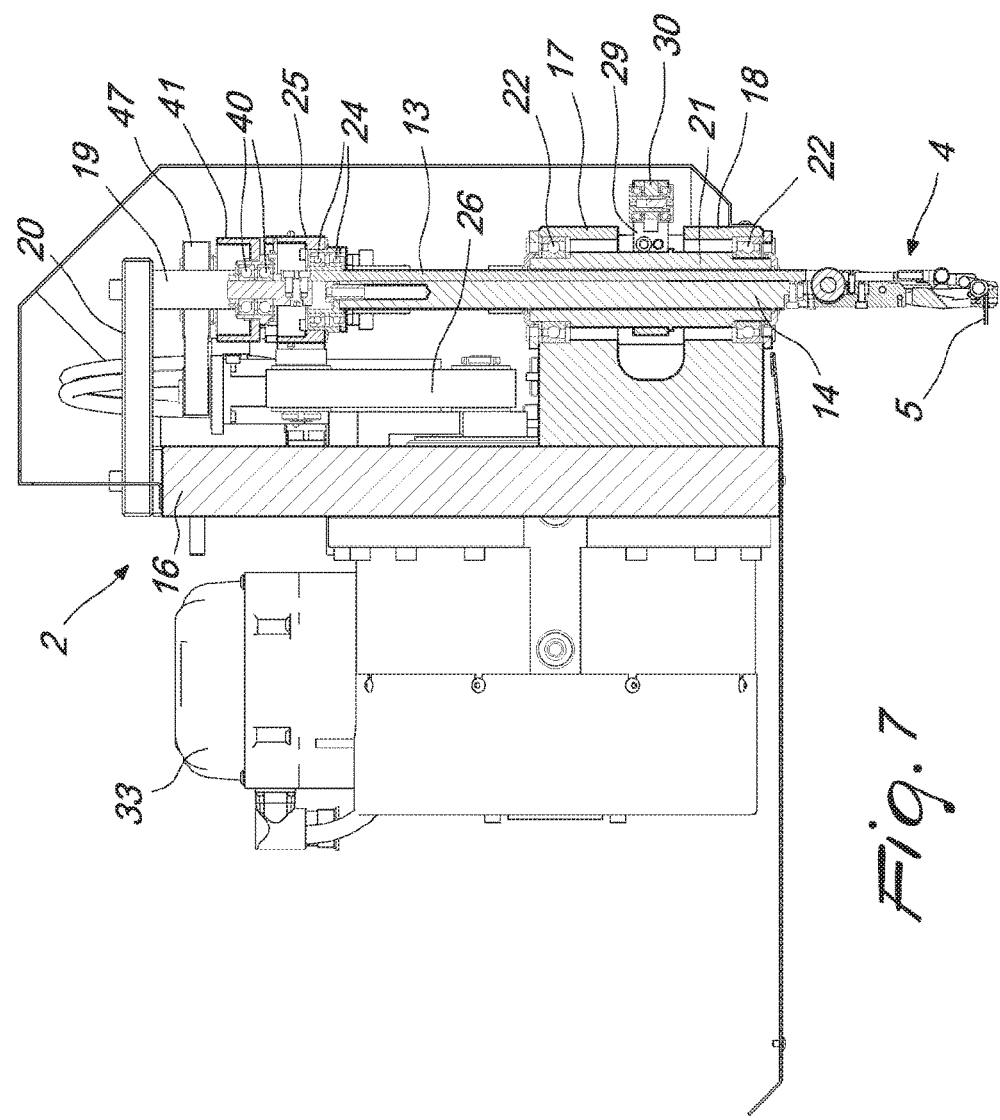
FIG. 7 is a sectional view of FIG. 3, taken along the line VII-VII.
Figure 8:
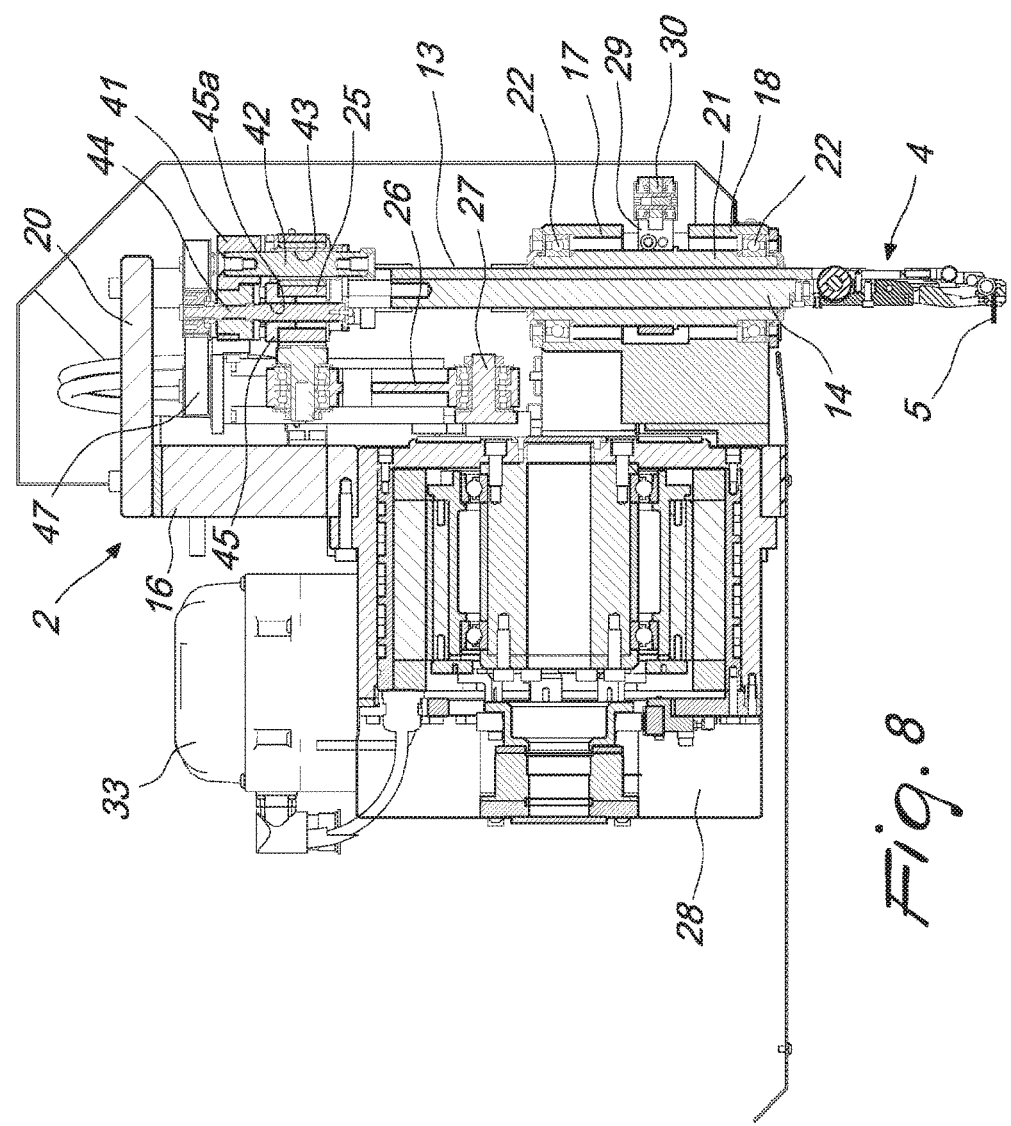
FIG. 8 is a sectional view of FIG. 3, taken along the line VIII-VIII.
Figure 13:
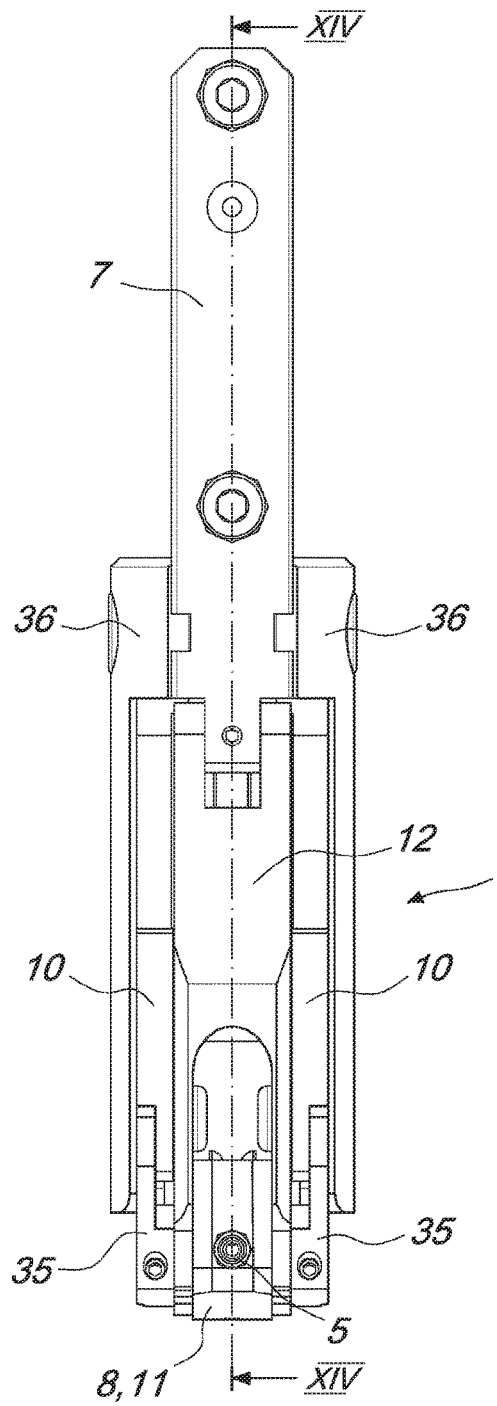
FIG. 13 is a front elevation view of the head of a spindle of the machine according to the invention.
Figure 14:
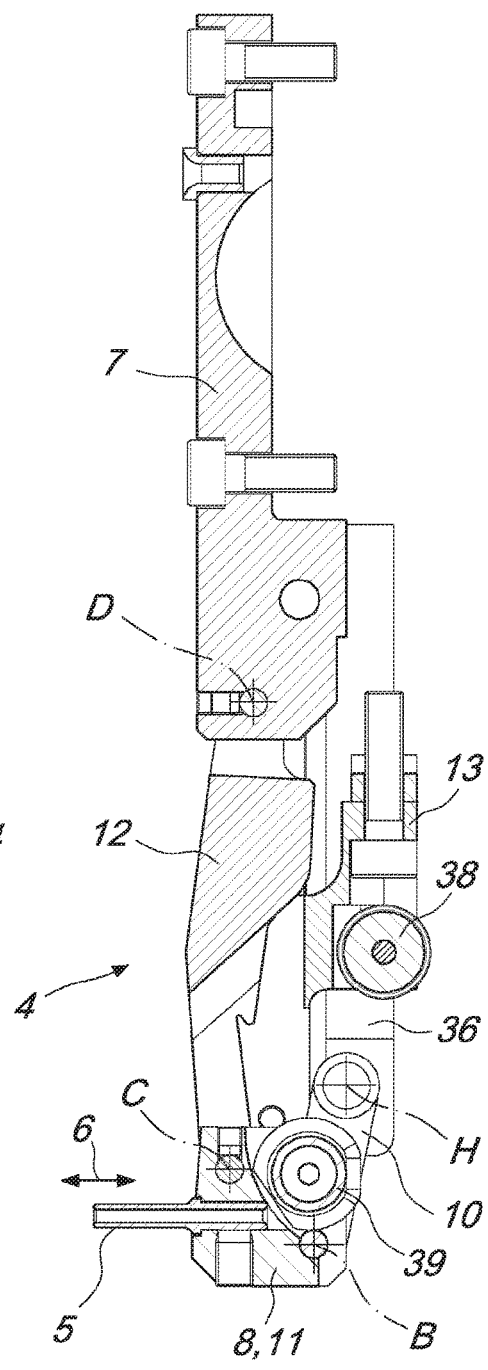
FIG. 14 is a sectional view of FIG. 13, taken along the line XIV-XIV.

With reference to the figures, the machine according to the invention comprises a main supporting structure 2, which supports at least one spindle 3, which is extended around a corresponding axis 3a and is provided, at an axial end thereof, with a head 4, which in turn supports a wire guiding tube 5.

According to the invention, the spindle 3 can move on command parallel to its own axis 3a and can rotate on command about its own axis 3a with respect to the main supporting structure 2 and the wire guiding tube 5 can rotate on command, with respect to the remaining part of the spindle 3, about a rotation axis that is substantially perpendicular to the axis of said wire guiding tube 5, and can move on command, with respect to the remaining part of the spindle 3, along a direction 6 that is oriented radially with respect to the axis 3a of the spindle 3. The direction 6 is referenced hereinafter as "radial direction 6" for greater clarity.

Thanks to these possibilities of motion of the wire guiding tube 5 and of the spindle 3, the machine according to the invention is capable of winding, by means of a copper wire 61, a pole 60 that protrudes internally from a cylindrical surface 62, as in the case of the poles of a stator of an electric motor, and to provide a plurality of layers of winding (layering), as will be described in greater detail hereinafter.

Figure 29:
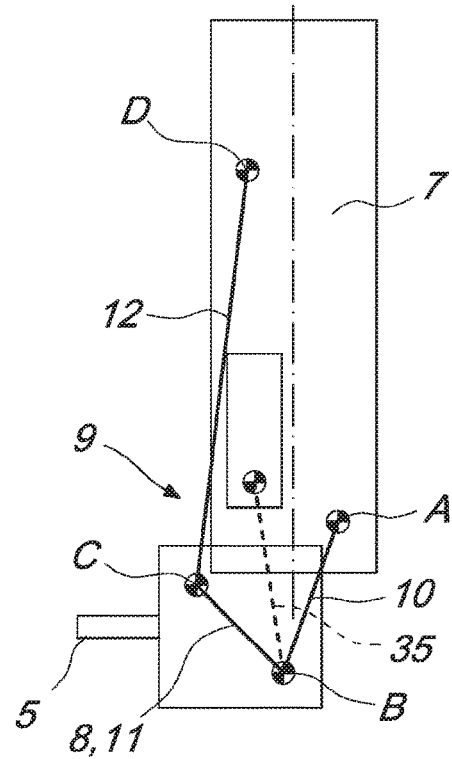
FIGS. 29 and 30 are views of the kinematic diagram related to the connection of the wire guiding tube to the remaining part of the spindle in the positions shown in FIGS. 22 and 28.
Figure 30:
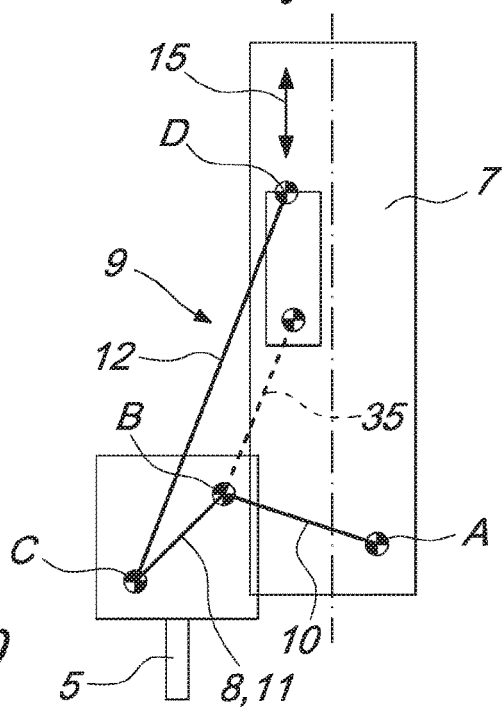
Figure 31:
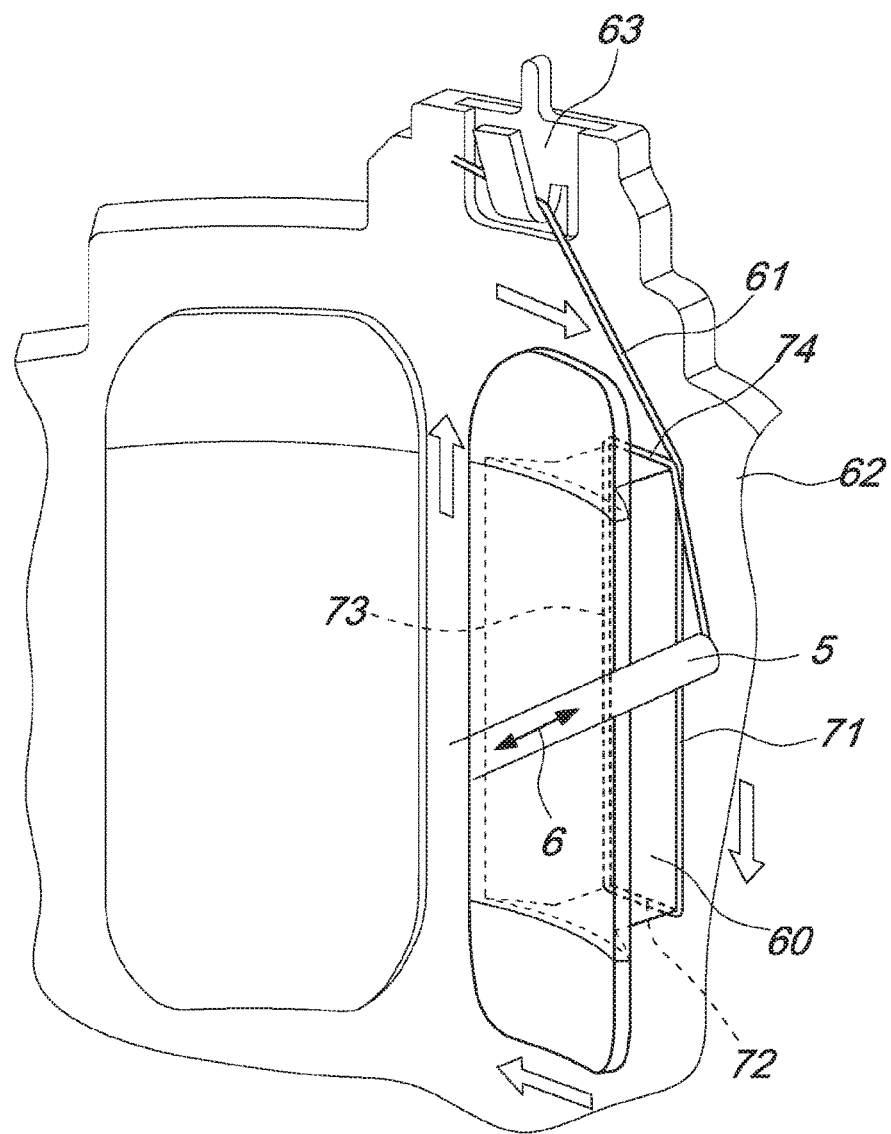
FIG. 31 is a schematic perspective view of the movement of a wire guiding tube of the machine according to the invention during the winding of a pole of a stator.

Conveniently, the head 4 comprises a body 7 of the head 4 that is fixed to the remaining part of the spindle 3 and a block 8 that supports the wire guiding tube 5. The block 8 is articulated to the body 7 of the head 4 by means of an articulated quadrilateral transmission 9, shown schematically in FIGS. 29 and 30, composed of three linkages, the pivoting axes of which are perpendicular to the axis 3a of the spindle 3, more precisely to a central plane 50 that passes through the axis 3a of the spindle 3 and through the axis of the wire guiding tube 5. More particularly, the articulated quadrilateral 9 comprises a first linkage 10, which is pivoted to the body 7 of the head 4 about a first pivoting axis A, and to the block 8, about a second pivoting axis B. The articulated quadrilateral 9 comprises a second linkage 11, constituted by the block 8, which is pivoted to the first linkage 10 about the axis B and to a third linkage 12 about a third pivoting axis C. The third linkage 12 is pivoted to the second linkage 11, about the axis C, and to the body 7 of the head 4, about a fourth pivoting axis D.

Advantageously, the linkages 10, 11, 12 and the corresponding pivoting axes A, B, C, D are arranged so that $(AD+CD)>2\cdot(AB+BC)$, where AB is the distance between the axes A and B, AD is the distance between the axes A and D, CD is the distance between the axes C and D, and BC is the distance between the axes B and C.

Preferably, the block 8 is connected to an actuation rod 13, which is associated slidingly with the body 14 of the spindle 3 and can move on command along a direction 15 that is parallel to the axis 3a of the spindle 3 in order to vary the configuration of the articulated quadrilateral 9 and consequently vary the position of the block 8 and of the wire guiding tube 5 with respect to the body 7 of the head 4 of the spindle 3. By way of the connection of the block 8 to the body 7 of the head 4, performed by means of the articulated quadrilateral 9 as described above, the translation of the actuation rod 13 along the direction 15, with respect to the body 14 of the spindle 3, achieves the rotation of the block 8 and therefore of the wire guiding tube 5 about a rotation axis that is perpendicular to the axis of the wire guiding tube 5 from a position in which the axis of the wire guiding tube 5 is arranged substantially at right angles to the axis 3a of the spindle 3 to a position in which the axis of the wire guiding tube 5 is arranged substantially parallel to the axis 3a of the spindle 3, as shown in FIGS. 22 to 28. Furthermore, again by means of the translation of the actuation rod 13 along the direction 15, with respect to the body 14 of the spindle 3, the movement of the block 8 along the radial direction 6, at right angles to the axis 3a of the spindle 3, is also achieved, as can be seen in FIGS. 22 to 25, which show the progressive translation of the actuation rod 13 (upwardly), obtaining a distance D1-D4 between the delivery end of the wire guiding tube 5 and the axis 3a of the spindle 3 that increases progressively (D1<D2<D3<D4). The translation of the actuation rod 13 along the direction 15 can be stopped in the chosen position so as to stop the wire guiding tube 5 in the desired position.

It should be noted that the connection described above of the block 8 to the body 7 of the head 4, performed by means of the linkages 10, 11, 12, causes the first portion of the translation of the actuation rod 13, parallel to the axis 3a of the spindle 3, upwardly in the figures, with respect to the body 7 of the head 4 or to the body 14 of the spindle 3, to obtain substantially exclusively a translation of the block 8 and therefore of the wire guiding tube 5 along the radial direction 6, while the subsequent portion also achieves the rotation of the block 8 about a rotation axis that is perpendicular to the axis of the wire guiding tube 5. Such rotation axis has not been shown in the figures since, as the block 8 is connected to the body 7 of the head 4 by means of the two linkages 10 and 12, its position varies depending on the rotational position of the two linkages 10 and 12. In any case, such rotation axis is parallel to the pivoting axes A, B, C, D.

More particularly, the main supporting structure 2 is composed substantially of a main plate 16, which is intended to be arranged usually vertically and from one face of which two secondary and mutually parallel plates 17, 18 protrude which lie on planes that are perpendicular to the face of the main plate 16 from which they protrude and which support a plurality of laterally adjacent spindles 3. In the illustrated embodiment, the secondary plates 17, 18 are constituted by two mutually parallel wings of a single part that is fixed to the main plate 16.

For the sake of simplicity in presentation and greater clarity, it is assumed hereinafter that the main plate 16 is arranged on a vertical plane and that the spindles 3 are arranged so that their axes 3a are vertical, as shown.

Two guiding posts 19 that protrude upwardly are fixed to the secondary plates 17, 18. The upper ends of the guiding posts 19 are connected to the main plate 16 by means of as an additional horizontal plate 20.

Each spindle 3 comprises a body 14 of the spindle 3 that is inserted coaxially and slidingly within a cylindrical sleeve 21 which is supported, so that it can rotate about its own axis, by the two secondary plates 17, 18 by means of a pair of bearings 22. The sleeve 21 is locked axially with respect to the secondary plates 17, 18, while the body 14 of the spindle 3 can slide axially with respect to the sleeve 21. It should be noted that the body 14 of the spindle 3, though being able to slide axially with respect to the sleeve 21, is rendered integral therewith in rotation about its own axis 3a by way of guides with crossed rollers 23, which facilitate the axial sliding of the body 14 of the spindle 3 with respect to the sleeve 21 and simultaneously constrain in rotation about the common axis 3a these two elements.

The upper end of the body 14 of each spindle 3 is connected, by way of the interposition of a pair of bearings 24, to a first crossmember 25, which is arranged horizontally and is supported, so that it can slide along a direction that is parallel to the axes 3a of the spindles 3, by the guiding posts 19. The first crossmember 25 is connected, by means of a mechanism with a linkage 26 and a crank 27, to a first actuation motor 28, which is connected, by means of its body, to the face of the main plate 16 that is opposite with respect to the face from which the two secondary plates 17, 18 protrude.

The actuation of the first motor 28 causes, by means of the linkage and crank mechanism 26-27, the translation of the bodies 14 of the spindles 3 along a direction that is parallel to their axes 3a, i.e., vertically in the arrangement shown in the figures. This translation affects only the bodies 14 of the spindles 3 and not also the sleeves 21, which, as mentioned, are locked axially to the two secondary plates 17, 18.

Each sleeve 21 is fixed to a wing clamp 29 and the various clamps 29 are pivoted to a connecting bar 30, which is arranged between the two secondary plates 17, 18. Furthermore, one of the clamps 29 (constituted in the embodiment shown by the clamp 29 that engages the sleeve 21 of the spindle 3 arranged at one end of the row of spindles 3) is connected, by means of a linkage 31, to a crank 32 that is integral with the output shaft of a second motor 33, which also is supported by the main plate 16 on the face thereof that lies opposite the face from which the secondary plates 17, 18 protrude.

The actuation of the second motor 33 produces, by means of the connecting bar 30, the simultaneous rotation, through an angle of preset breadth, of the sleeves 21 and therefore of the body 14 of the various spindles 3 about the corresponding axes 3a.

The body 7 of the head 4 of each spindle 3 is fixed, by means of a pair of screws 34, to the lower end of the body 14 of the corresponding spindle 3. As explained above, the block 8 that supports the wire guiding tube 5 is connected to the body 7 of the head 4 by means of an articulated quadrilateral 9 that is composed of three linkages 10, 11, 12, in which the block 8 constitutes the second linkage 11 or intermediate linkage.

In order to meet balancing and centering requirements, two first linkages 10 are provided, which are substantially mutually identical and are arranged symmetrically with respect to the central plane 50, which passes through the axis 3a of the corresponding spindle 3 and through the axis of the wire guiding tube 5, and there is also, for the third linkage 12, a fork-like shape that is composed of two arms that are arranged mutually symmetrically with respect to the central plane 50.

The block 8 is connected, by means of a fourth linkage 35, or rather by means of a pair of fourth linkages 35 arranged mutually symmetrically with respect to the above cited central plane 50, to the actuation rod 13, which is laterally adjacent to the body 14 of the corresponding spindle 3 and is associated, so that it can slide with respect to it, along the direction 15 that is parallel to the axis 3a of the spindle 3. Each linkage 35 is hinged, with one of its ends, to the block 8 at the pivoting axis B of the first linkage 10 to the block 8 and is pivoted, with its opposite end, to the actuation rod 13.

Figure 15:
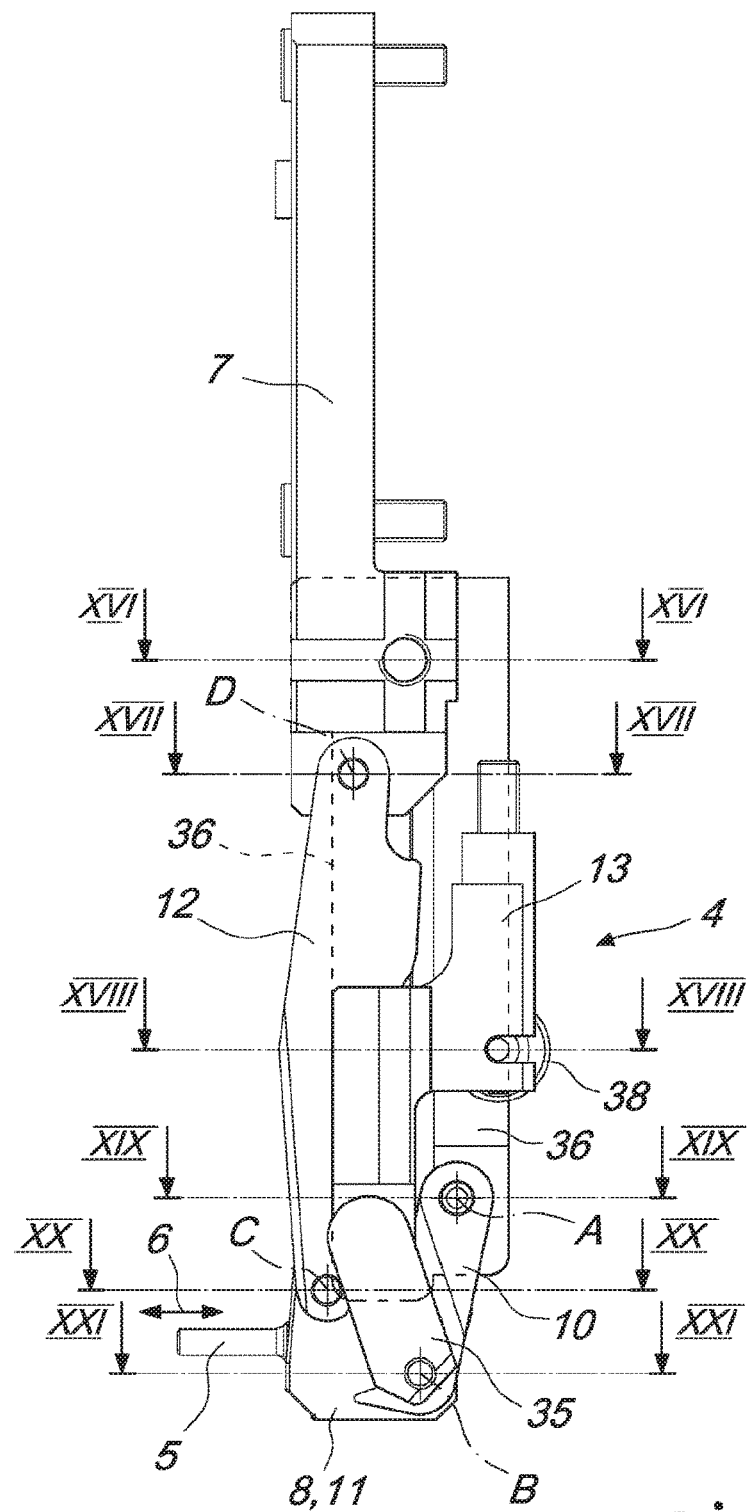
FIG. 15 is a side elevation view of the head of a spindle of the machine according to the invention, with an element removed for greater clarity.
Figure 16:
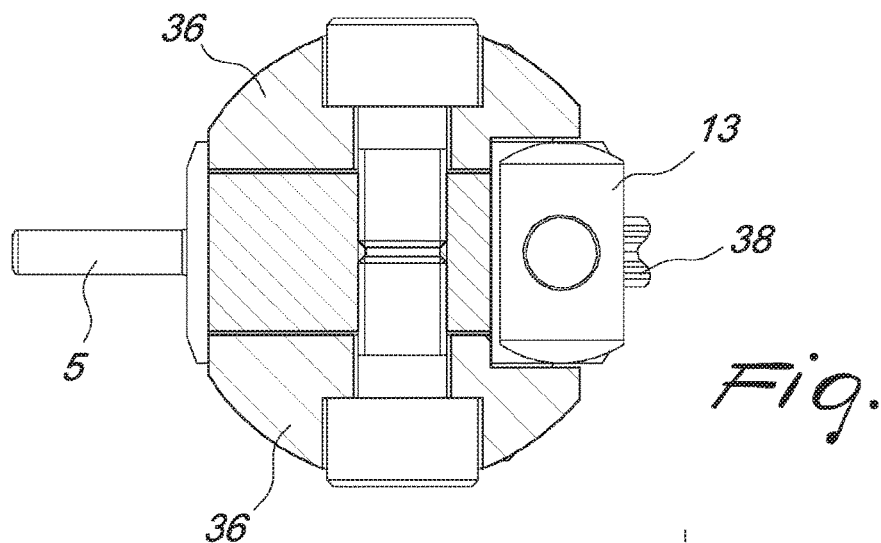
FIG. 16 is a sectional view of FIG. 15, taken along the line XVI-XVI.
Figure 17:
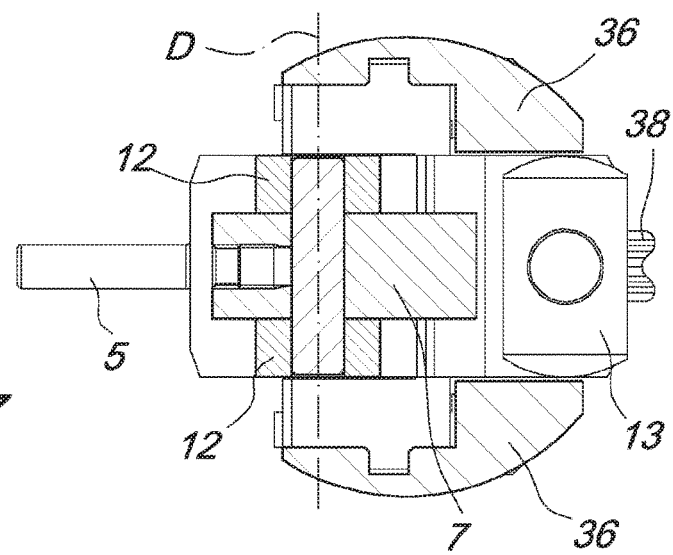
FIG. 17 is a sectional view of FIG. 15, taken along the line XVII-XVII.
Figure 18:
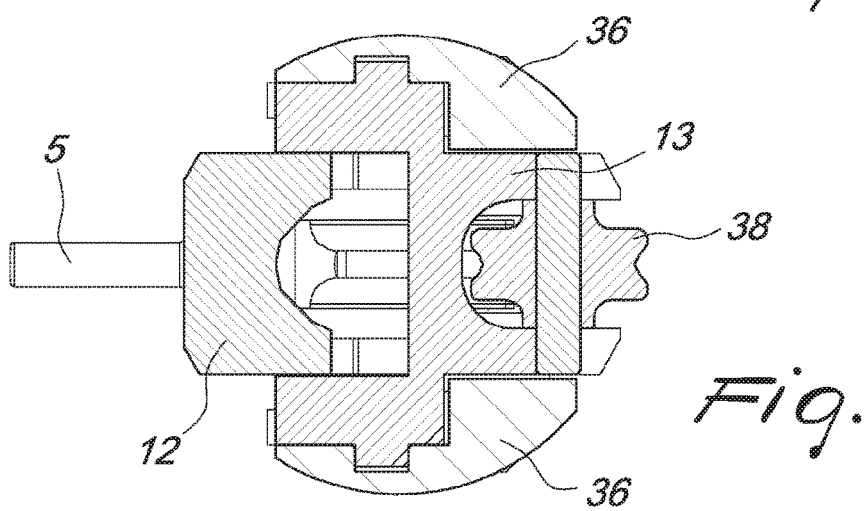
FIG. 18 is a sectional view of FIG. 15, taken along the line XVIII-XVIII.
Figure 19:
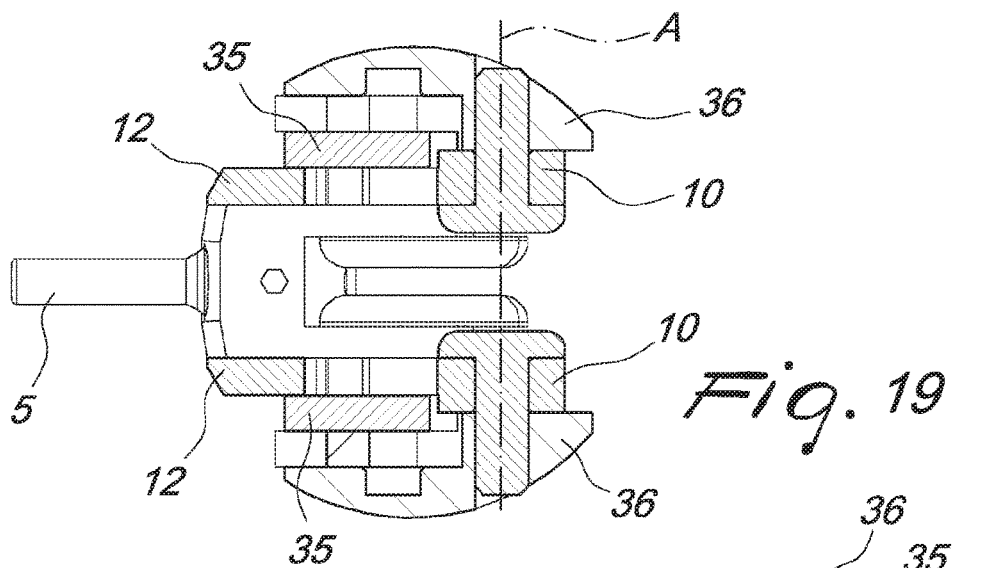
FIG. 19 is a sectional view of FIG. 15, taken along the line XIX-XIX.
Figure 20:
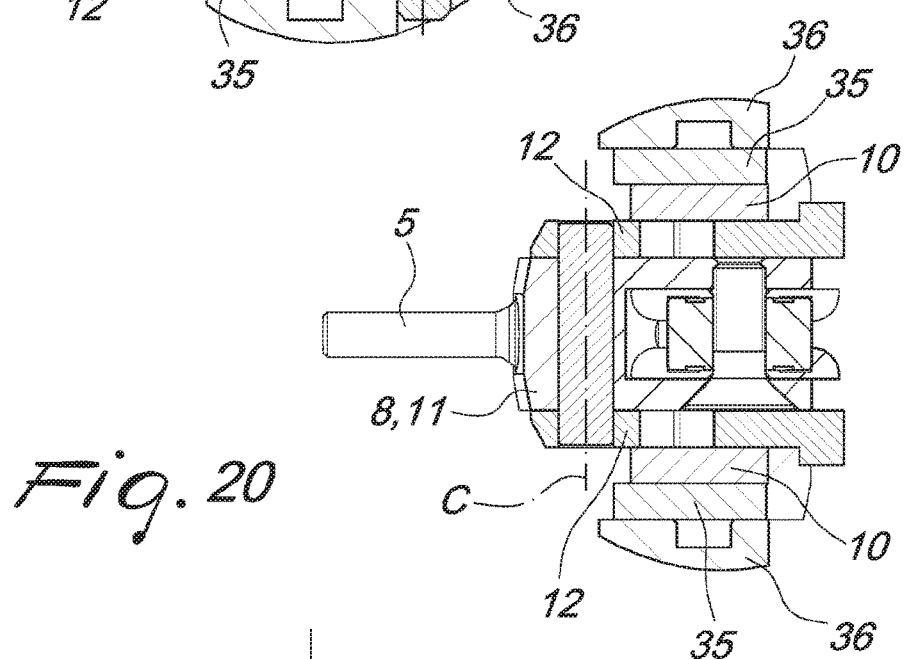
FIG. 20 is a sectional view of FIG. 15, taken along the line XX-XX.
Figure 21:
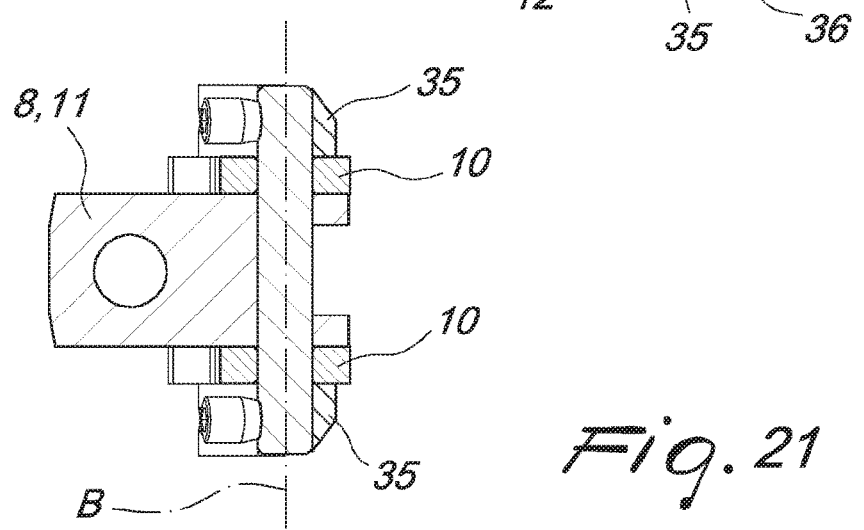
FIG. 21 is a sectional view of FIG. 15, taken along the line XXI-XXI.
Figures 22, 23:
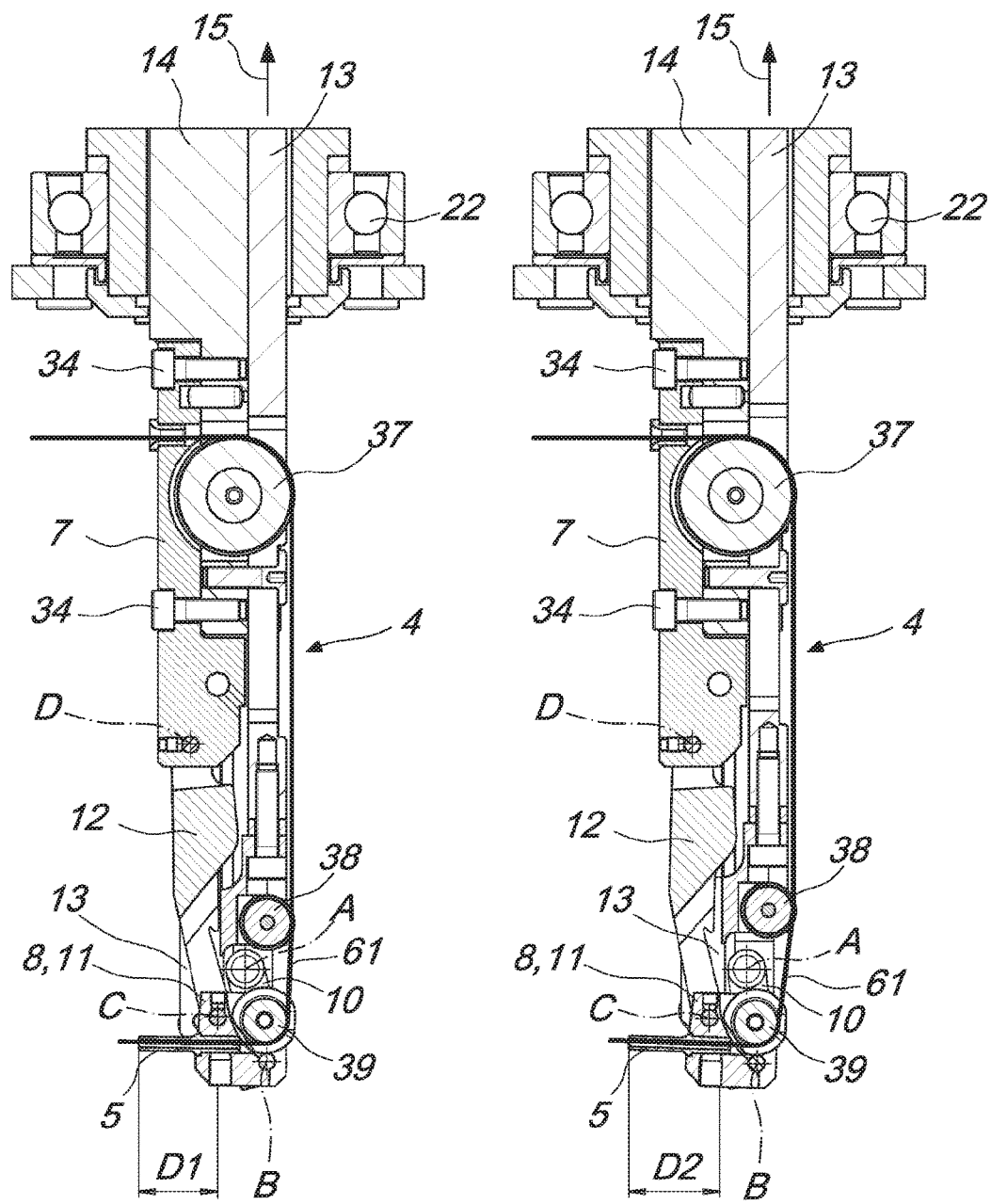
Figure 28:
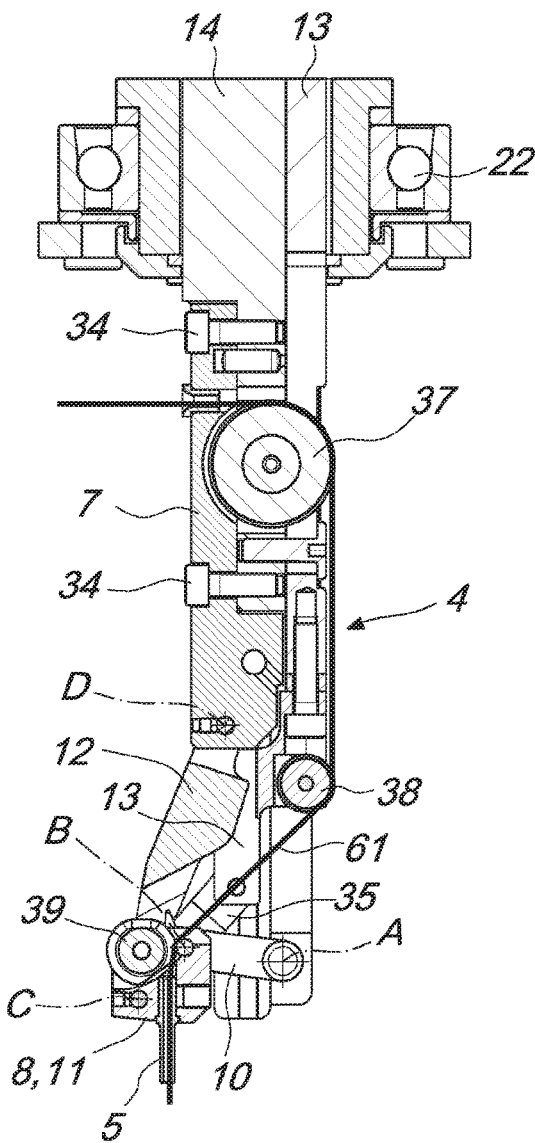

The body 7 of the head 4 of each spindle 3 comprises a pair of side walls 36, shaped like a portion of a cylinder, which are fixed to the remaining part of the body 7 of the head 4 and cover almost completely the linkages 10, 11, 12 that connect the block 8 to the body 7 of the head 4 and the linkages 35. One of these side walls has been omitted in FIG. 15 in order to allow to view the linkages 10, 11, 12 and 35. It should be noted that the linkages 10 are pivoted about the axis A to a corresponding side wall 36 of the body 7 of the head 4.

The body 7 of each head 4 supports, proximate to its upper end, a first guiding pulley 37 for the winding wire 61. A second guiding pulley 38 for the wire 61 is supported by the actuation rod 13 proximate to its lower end. A third guiding pulley 39 for the wire 61 is mounted on the block 8.

The upper end, i.e., the end that lies opposite with respect to the end that is connected to the head 4, of each actuation rod 13 is connected, by way of the interposition of a pair of bearings 40, to a second crossmember 41, which is arranged above the first crossmember 25.

The second crossmember 41 is fixed to the upper end of a pair of guiding posts 42, which have vertical axes and are coupled so that they can slide axially within seats 43 defined within the first crossmember 25.

The second crossmember 41 supports, so that they can rotate about their respective axes, two shafts 44 that have vertical axes, are locked axially so that they can rotate about the corresponding axes with respect to the second crossmember 41. The shafts 44 are provided with a threaded portion 44a which mates with a female thread 45a defined within a corresponding bush 45 that is fixed to the first crossmember 25.

The upper ends of the two shafts 44 protrude upwardly from the second crossmember 41 and are fixed to corresponding toothed pulleys 46, which are connected, by means of a toothed belt 47, to the output shaft 48 of a third motor 49, constituted for example by a step motor. The third motor 49 is mounted with its body on the second crossmember 41 so that its actuation causes, by means of the toothed belt 47 and the toothed pulleys 46, the rotation of the shafts 44 and consequently the translation, along a vertical direction, i.e., parallel to the axes 3a of the spindles 3, of the second crossmember 41 with respect to the first crossmember 25 and therefore the simultaneous translation of the actuation rods 13 associated with the various spindles 3.

It should be noted that, by keeping the third motor 49 stationary, the second crossmember 41 can be translated parallel to the axes 3a of the spindles 3 integrally with the first crossmember 25 or, by actuating the third motor 49, can be translated parallel to the axes 3a of the spindles 3 with respect to the first crossmember 25. The integral translation of the two crossmembers 25 and 41 simply causes the vertical movement of the spindles 3 and consequently the vertical movement of the blocks 8 integrally with the corresponding spindle 3, while the translation of the second crossmember 41 with respect to the first crossmember 25 causes the movement of the actuation rods 13 with respect to the body 14 of the corresponding spindle 3 and consequently varies the geometry of the articulated quadrilaterals 9, causing the rotation of the blocks 8 about an axis that is perpendicular to the axis of the corresponding wire guiding tube 5 and/or the translation of the blocks 8 along the radial direction 6.

The machine according to the invention is completed, in a per se known manner, by a platform that is intended to support the parts, i.e., the stators, to be wound. Such platform can be provided, in a per se known manner, with means for positioning the parts to be wound and served by means for cutting the winding wire 61. Such elements can be constituted by elements of a known type and are not illustrated and described for the sake of simplicity.

Furthermore, the main plate 16 can be mounted on a carriage that can be moved along one or more axes, depending on the winding requirements.

Operation of the winding machine according to the invention is as follows.

At the beginning of the winding process, the wire guiding tube 5 supported by each spindle 3 is oriented so that its axis is vertical above a corresponding part, for example the stator of an electric motor, to be wound with a copper wire 61 that is guided along the path defined by the pulleys 37, 38, 39 and protrudes from the wire guiding tube 5. By means of the horizontal movement of the part to be wound with respect to the spindle 3, which can be obtained by moving the platform that supports the parts to be wound, not shown, or by moving the main plate 16, one end of the wire 61 is fixed to a pin 63 that is provided for this purpose on the part to be wound.

Then, by actuating the third motor 49, the second crossmember 41 is translated vertically with respect to the first crossmember 25, causing, due to the connection provided by the articulated quadrilateral 9, the rotation of each block 8 with respect to the body 7 of the head 4 about an axis that is perpendicular to the axis of the wire guiding tube 5 and causing simultaneously the translation of the block 8 along the radial direction 6. In this manner, the end of each wire guiding tube 5 from which the wire 61 exits is rotated substantially through 90°, making it face the inner side of the corresponding cylindrical surface 62 from which the poles 60 around which the wire 61 is to be wound protrude. At this point, by activating the first motor 28, the spindles 3 are made to descend parallel to the corresponding axes 3*a*, each one inside the corresponding part whose poles are to be wound, i.e., within the space delimited by the cylindrical surface 62 of the corresponding part and parallel to the axis of the cylindrical surface 62, so that each spindle 3 produces a first portion 71 of the winding turn that is extended parallel to the axis of the cylindrical surface 62 from which the poles 60 be to be wound protrude. Subsequently, by actuating the second motor 33, the simultaneous rotation of the spindles 3 through an angle of preset breadth is produced, so that each spindle 3 rotates about its own axis 3*a* through an angle of preset breadth, providing a second portion 72 of a winding turn that is extended circumferentially around the axis of the cylindrical surface 62 from which the poles 60 to be wound protrude.

Further subsequently, by actuating the first motor 28, the rise of the spindles 3 parallel to the corresponding axes 3*a* is produced, so that each spindle 3 provides a third portion 73 of winding turn that is extended parallel to the axis of the cylindrical surface 62 from which the poles 60 to be wound protrude.

Finally, by again actuating the second motor 33, the simultaneous rotation of the spindles 3 through an angle of preset breadth is produced so that each spindle 3 rotates about its own axis 3*a* through an angle of preset breadth, forming a fourth portion 74 of a winding turn that is extended circumferentially around the axis of the cylindrical surface 62 from which the pols 60 to be wound protrude, thus completing a turn of the winding.

At this point, before beginning to form a new turn, the third motor 49 is actuated and by moving, downward in the drawings, the actuation rods 13 parallel to the axis of the corresponding spindle 3 with respect to the body of each spindle 3, produces a translation of the corresponding block 8 and therefore of the corresponding wire guiding tube 5 along the radial direction 6 away from the cylindrical surface 62 from which the poles 60 to be wound protrude. The extent of this movement is substantially equal to the thickness of the wire 61 used and therefore presets the wire guiding tube 5 in the position suitable to provide a second turn to the side or rather closer to the axis of the cylindrical surface 62 from which the poles 60 to be wound protrude with respect to the already provided turn.

At this point the cycle resumes, as already described, and continues with the radial movement, in each instance, for each spindle 3, of the wire guiding tube 5 away from the cylindrical surface 62 until the first winding layer of the pole 60 is completed. The cycle then continues with the provision of a second winding layer starting from the end of the pole 60 that is spaced from the cylindrical surface 62 from which it protrudes and by moving progressively the wire guiding tube 5 toward the cylindrical surface 62, by way of the movement, upwardly in the drawings, of the actuation rod 13 parallel to the axis 3*a* of the corresponding spindle 3 with respect to the body of each spindle 3, until the second winding layer is completed.

The cycle then continues as described above until the winding of a pole 60 is completed. Subsequently, each part subjected to winding is rotated about the axis of the cylindrical surface 62 in a per se known manner, so as to arrange a new pole 60 to be wound at the corresponding spindle 3.

It should be noted that although an arrangement of the spindles 3 with their axes arranged vertically is preferred, the orientation of the axis of the spindles 3 may vary according to the requirements.

In practice it has been found that the winding machine according to the invention fully achieves the intended aim, since by being able to perform the winding and layering operations of the wire by moving simply the spindle, which has a modest mass, it can reach considerably higher winding speeds than attainable with machines of the known type, which entail, to achieve the winding and/or layering of the wire, the movement of the part being wound.

Furthermore, thanks to this fact it is possible to increase the number of spindles and therefore provide a plurality of windings simultaneously, achieving distinctly higher productivities than attainable with needle winding machines of the known type.

The winding machine thus conceived is susceptible of numerous modifications and variations, all of which are within the scope of the appended claims; all the details may further be replaced with other technically equivalent elements.

In practice, the materials used, as well as the dimensions, may be any according to requirements and to the state of the art.

The disclosures in Italian Patent Application No. MI2014A001787 (102014902300757) from which this application claims priority are incorporated herein by reference.

The invention claimed is:

1. A needle winding machine comprising a main supporting structure that supports at least one spindle that is extended around an axis and is provided, at an axial end thereof, with a head that supports a wire guiding tube, wherein said spindle can move on command parallel to its own axis and can rotate on command about its own axis with respect to said main supporting structure, and wherein said wire guiding tube can rotate on command, with respect to a remaining part of the spindle, about a rotation axis that is substantially perpendicular to an axis of said wire guiding tube and can move on command, with respect to the remaining part of the spindle, along a direction that is oriented radially with respect to the axis of the spindle, wherein said head comprises a body of the head that is fixed to the remaining part of the spindle and a block that supports said wire guiding tube, said block being articulated to said body of the head by means of an articulated quadrilateral transmission composed of three linkages with pivoting axes that are parallel to each other and are perpendicular to the axis of said spindle: respectively, a first linkage that is pivoted to said body of the head and to said block, a second linkage constituted by said block, and a third linkage that is pivoted to said block and to said body of the head.

2. The machine according to claim 1, wherein said pivoting axes of the linkages of said articulated quadrilateral transmission are perpendicular to a central plane that passes through the axis of said spindle and through the axis of said wire guiding tube.

3. The machine according to claim 1, wherein if AD is the distance between the pivoting axes of said first linkage and of said third linkage to the body of the head, AB is the distance between the pivoting axes of the first linkage respectively to said body of the head and to said second linkage, BC is the distance between the pivoting axes of said second linkage or of said block respectively to said first linkage and to said third linkage, CD is the distance between the pivoting axes of said third linkage respectively to said second linkage and to said body of the head, then (AD+CD)>2·(AB+BC).

4. The machine according to claim 1, wherein said block is connected to an actuation rod that is associated slidingly with a body of the spindle and can move on command along a direction that is parallel to said axis of the spindle in order to vary the configuration of said articulated quadrilateral transmission.

5. The machine according to claim 4, wherein said actuation rod is connected to said block by means of a fourth linkage that is pivoted to said block about a same pivoting axis of said first linkage to said block.

6. The machine according to claim 4, wherein said spindle is connected, by means of its body, to a first crossmember that is supported slidingly by said main supporting structure and can move on command along a direction that is parallel to the axis of said spindle relative to said main supporting structure.

7. The machine according to claim 6, wherein said actuation rod is connected to a second crossmember, which is supported slidingly by said first crossmember and can move on command along a direction that is parallel to the axis of said spindle with respect to said first crossmember.

8. The machine according to claim 7, wherein said second crossmember can move integrally with said first crossmember along said direction that is parallel to the axis of said spindle for a translation of said spindle parallel to its own axis without rotation of said block about said rotation axis, and in that said second crossmember can move with respect to said first crossmember along said direction that is parallel to the axis of said spindle for a rotation of said block about said rotation axis with respect to the body of the head and/or for a translation of said block along said direction that is substantially perpendicular to the axis of the spindle with respect to the remaining part of the spindle without translation of said spindle parallel to its own axis with respect to said main supporting structure.

9. The machine according to claim 1, wherein said at least one spindle comprises a plurality of spindles with axes that are parallel to each other and are mutually connected in rotation about said axes with respect to said main supporting structure.

10. The machine according to claim 9, further comprising a single first crossmember that is connected to the bodies of said plurality of spindles and a single second crossmember that is connected to an actuation rod of the blocks of the plurality of spindles.

* * * * *